No. 654,709. Patented July 31, 1900.
R. J. BUNGARD.
SCAFFOLDING.
(Application filed Feb. 19, 1900.)
(No Model.)
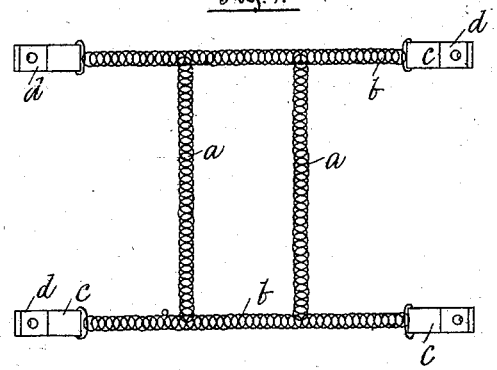
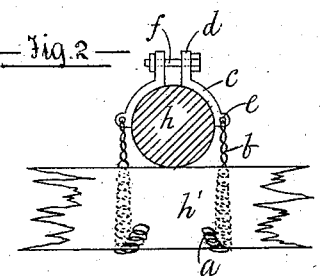
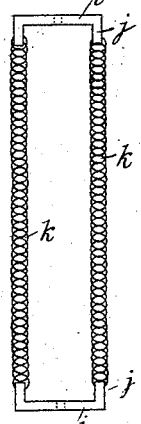
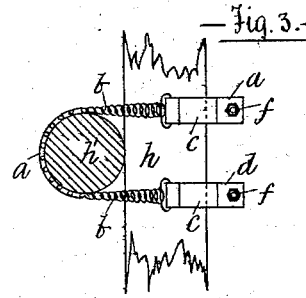
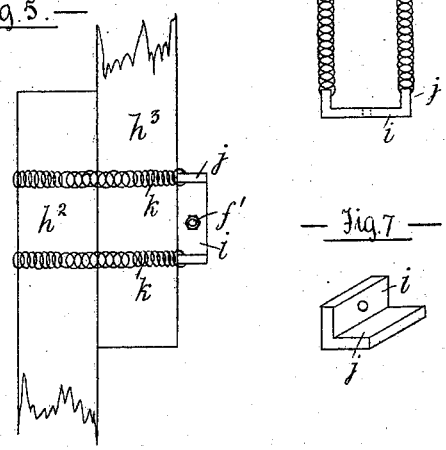
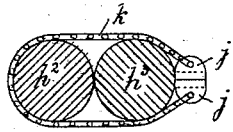
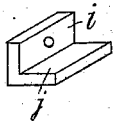
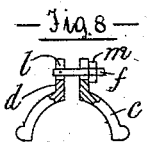
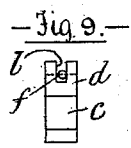
Witnesses:—
William Crosby
A. Clarke
Inventor
Richard James Bungard
per Hughes & Young
Attorneys.

UNITED STATES PATENT OFFICE.

RICHARD JAMES BUNGARD, OF LONDON, ENGLAND.

SCAFFOLDING.

SPECIFICATION forming part of Letters Patent No. 654,709, dated July 31, 1900.

Application filed February 19, 1900. Serial No. 5,741. (No model.)

*To all whom it may concern:*

Be it known that I, RICHARD JAMES BUNGARD, a subject of the Queen of Great Britain and Ireland, residing at 1 Montrose Villas, Primrose road, Leyton, London, in the county of Essex, England, have invented new and useful Improvements in Connection with the Erection of Scaffolding, (for which I have applied for a patent in Great Britain, No. 15,041, bearing date July 21, 1899,) of which the following is a specification.

In carrying my invention into effect I proceed in or in about the following manner, making reference to the accompanying drawings, in which—

Figure 1 is a front view of the appliance for use in holding two poles at an angle with one another; Fig. 2 a plan, and Fig. 3 a side view, showing the appliance in use. Fig. 4 is a front view, Fig. 5 a side view, and Fig. 6 a plan, of the appliance for attaching one pole to another to obtain greater length or height. Fig. 7 is an isometric view of a part of what is shown in Figs. 4, 5, and 6. Fig. 8 is a plan, and Fig. 9 an end view, of a modification in a part applicable to both the above appliances.

Referring to the attachment of one pole to another, as in the case of one being vertical and the other horizontal, I provide a chain $a$ or several such chains having two other chains $b$ at right angles thereto. At each free end of the chains $b$ are clips, each consisting of a curved part $c$ and an ear $d$. The clips are attached to the chain ends by links passing through holes $e$, and the ears $d$ are bored and screw-threaded to receive the bolts $f$. The bolt-hole through one of each pair of the clips is somewhat oval in shape, so as to admit of the amount of movement necessary for tightening up the parts, as hereinafter mentioned. In use the chain is clipped to one of the poles $h$ by one of the pairs of clips, as shown in Fig. 2, and the other pole $h'$ placed at the required angle. The chains $a$ are then passed around the pole $h$, and the other pair of clips, fastened around the first-mentioned pole at the proper distance above referred to, facilitate the drawing of the parts together. In attaching one pole to another, so as to increase the length or height, I employ a somewhat different arrangement, consisting of angle-pieces $i$, having ears $j$, to which are attached the ends of the chains $k$. A screw-bolt $f'$ passes through the parts $i$, so as to hold them around the pole. In use chains $k$ are passed around the poles $h^2 h^3$, and the ears being brought together are secured by the bolts $f'$, one of the holes for which is made oval, as in the former arrangement. In Fig. 7 the parts $i$ and $j$ are shown in modified form. In both the above appliances more than one bolt $f$ or $f'$ may be used.

Instead of having an oval hole in one of each of the parts $d$ and $i$ I sometimes provide an open slot, such as $l$, Fig. 8, in which case one end of the bolt $f$ or $f'$ is pivoted within an opening in its respective part $d$ or $i$, and the other end of $f$ or $f'$ has a nut $m$ for tightening up the several parts, so as to hold the chains around the poles.

What I claim as my invention, and desire to secure by Letters Patent, is—

1. An appliance for holding in position two scaffold-poles at an angle with one another, the said appliance comprising several parallelly-placed chains having their ends connected by two other parallelly-placed chains having their free ends projecting beyond the first-mentioned chains and having at the said free ends clips to embrace one of the said scaffold-poles and bolts to hold the clip in position, substantially as described and shown.

2. An appliance for holding in position two scaffold-poles at an angle with one another, the said appliance comprising a chain having at each end another chain crossing at right angles, the free ends of the said cross-chains projecting beyond the said chain, the cross-chains having at their free ends clips to embrace one of the said scaffold-poles and bolts to hold the clip in place, substantially as described and shown.

In testimony whereof I have signed my name to this specification in the presence of two witnesses.

RICHARD JAMES BUNGARD.

Witnesses:
PETER HUGHES,
ARTHUR CARRICK.